United States Patent
Tsuji et al.

(10) Patent No.: US 9,503,774 B2
(45) Date of Patent: Nov. 22, 2016

(54) INFORMATION DISPLAY DEVICE

(71) Applicant: PANASONIC CORPORATION, Osaka (JP)

(72) Inventors: Hisashi Tsuji, Fukuoka (JP); Junji Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 14/457,564

(22) Filed: Aug. 12, 2014

(65) Prior Publication Data

US 2014/0351849 A1 Nov. 27, 2014

Related U.S. Application Data

(63) Continuation of application No. PCT/JP2012/006199, filed on Sep. 27, 2012.

(30) Foreign Application Priority Data

Feb. 24, 2012 (JP) .................................. 2012-038461

(51) Int. Cl.
*H04N 21/422* (2011.01)
*H04N 21/41* (2011.01)
*H04N 21/482* (2011.01)

(52) U.S. Cl.
CPC .... *H04N 21/42209* (2013.01); *H04N 21/4126* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 7,430,410 B2 | 9/2008 | Iwatsu et al. | |
| 7,583,928 B2 | 9/2009 | Iwatsu et al. | |
| 7,844,259 B2 | 11/2010 | Iwatsu et al. | |
| 8,271,797 B2 | 9/2012 | Araki et al. | |
| 2005/0160452 A1* | 7/2005 | Lawler | H04N 5/44543 725/38 |
| 2006/0026647 A1* | 2/2006 | Potrebic | H04N 5/44582 725/53 |

(Continued)

FOREIGN PATENT DOCUMENTS

| | | |
|---|---|---|
| JP | 2004-153551 A | 5/2004 |
| JP | 2011-091675 A | 5/2011 |
| WO | 2005-006616 A1 | 1/2005 |

OTHER PUBLICATIONS

International Search Report issued in PCT/JP2012/006199, dated Jan. 8, 2013, with English translation.

*Primary Examiner* — Omar S Parra
(74) *Attorney, Agent, or Firm* — McDermott Will & Emery LLP

(57) ABSTRACT

An information display device includes: a display unit, an information obtaining unit which obtains program-related information related to a video program displayed on a video display device following the video program; and a terminal control unit which causes the display unit to display the program-related information obtained by the information obtaining unit. When the information obtaining unit is unable to obtain first program-related information related to a first video program currently displayed on the video display device following the first video program, the terminal control unit causes the display unit to display (i) second program-related information distributed before the first video program is displayed on the video display device, or (ii) third program-related information related to the second video program displayed before the first video program is displayed on the video display device.

4 Claims, 18 Drawing Sheets

(56) References Cited

U.S. PATENT DOCUMENTS

| | | | |
|---|---|---|---|
| 2006/0160509 A1* | 7/2006 | Iwatsu | H04H 20/82 455/185.1 |
| 2006/0168651 A1 | 7/2006 | Araki et al. | |
| 2006/0221932 A1 | 10/2006 | Iwatsu et al. | |
| 2008/0275954 A1 | 11/2008 | Iwatsu et al. | |

* cited by examiner

FIG. 5

| ID | Program name | Broadcast station | Program starting day and time | Program ending day and time | Description |
|---|---|---|---|---|---|
| 0001 | Movie A | xx-TV | 1/1/2012 12:00 | 1/1/2012 12:59 | ..... |
| 0002 | Drama B | xx-TV | 1/1/2012 13:00 | 1/1/2012 13:59 | ..... |
| ... | ... | ... | ... | ... | ... |

FIG. 6

| Meta ID | Program ID | Display day and time | Category | Title | Description | Image URL | Linked URL |
|---|---|---|---|---|---|---|---|
| 0001 | 0001 | 1/1/2012 12:05 | Human | Nobunaga ODA | ... | | |
| 0002 | 0001 | 1/1/2012 12:05 | Plant | Sunflower | ... | | |
| 0003 | 0001 | 1/1/2012 12:10 | Sightseeing spot | Kiyomizu temple | ... | | |
| 0004 | 0001 | 1/1/2012 12:15 | Machine | Digital camera | ... | | |
| ... | ... | ... | ... | ... | ... | ... | ... |
| 0032 | 0002 | 1/1/2012 13:05 | Human | Person B | ... | | |
| 0033 | 0002 | 1/1/2012 13:05 | Commodity | Person B's clothes | ... | | |
| 0034 | 0002 | 1/1/2012 13:10 | Commodity | Sponge cake | ... | | |
| 0035 | 0002 | 1/1/2012 13:15 | Sightseeing spot | Kinkaku-ji | ... | | |
| ... | ... | ... | ... | ... | | | |

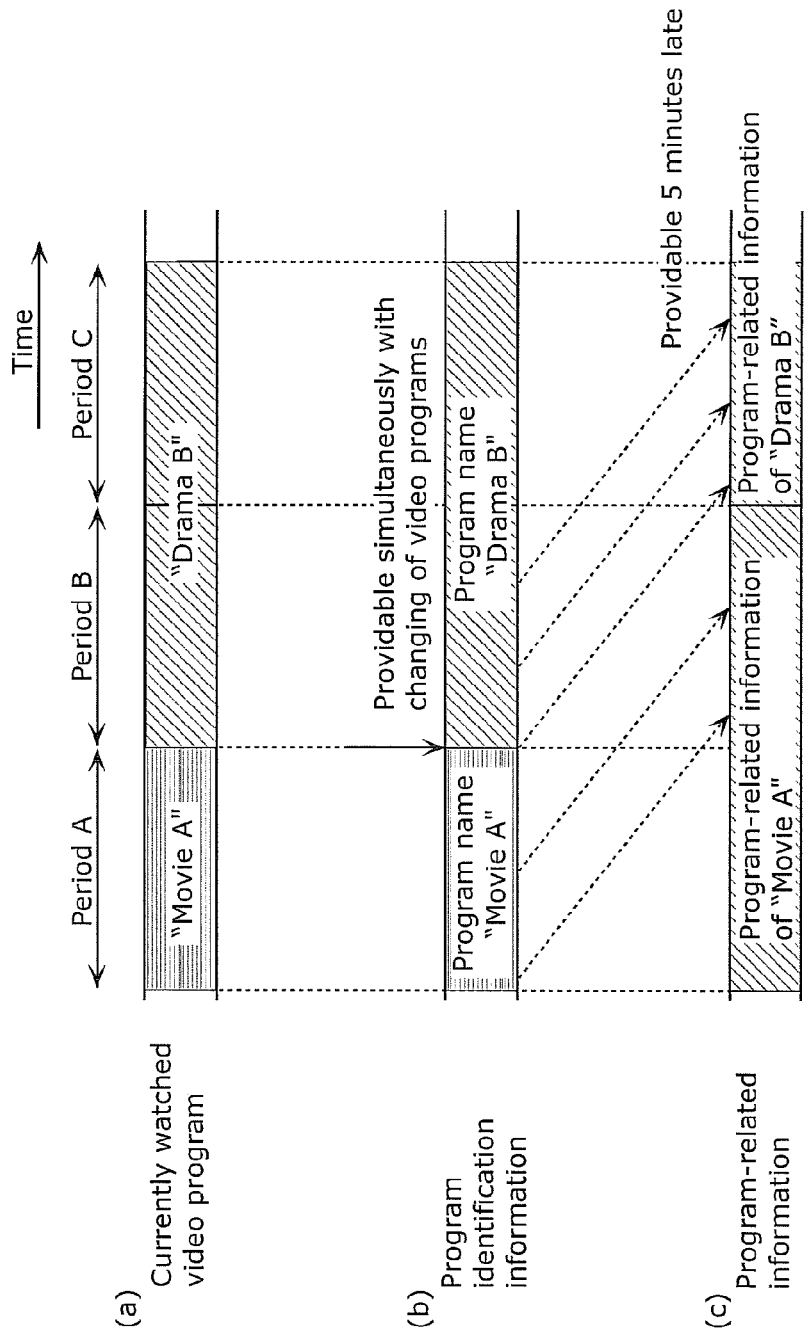

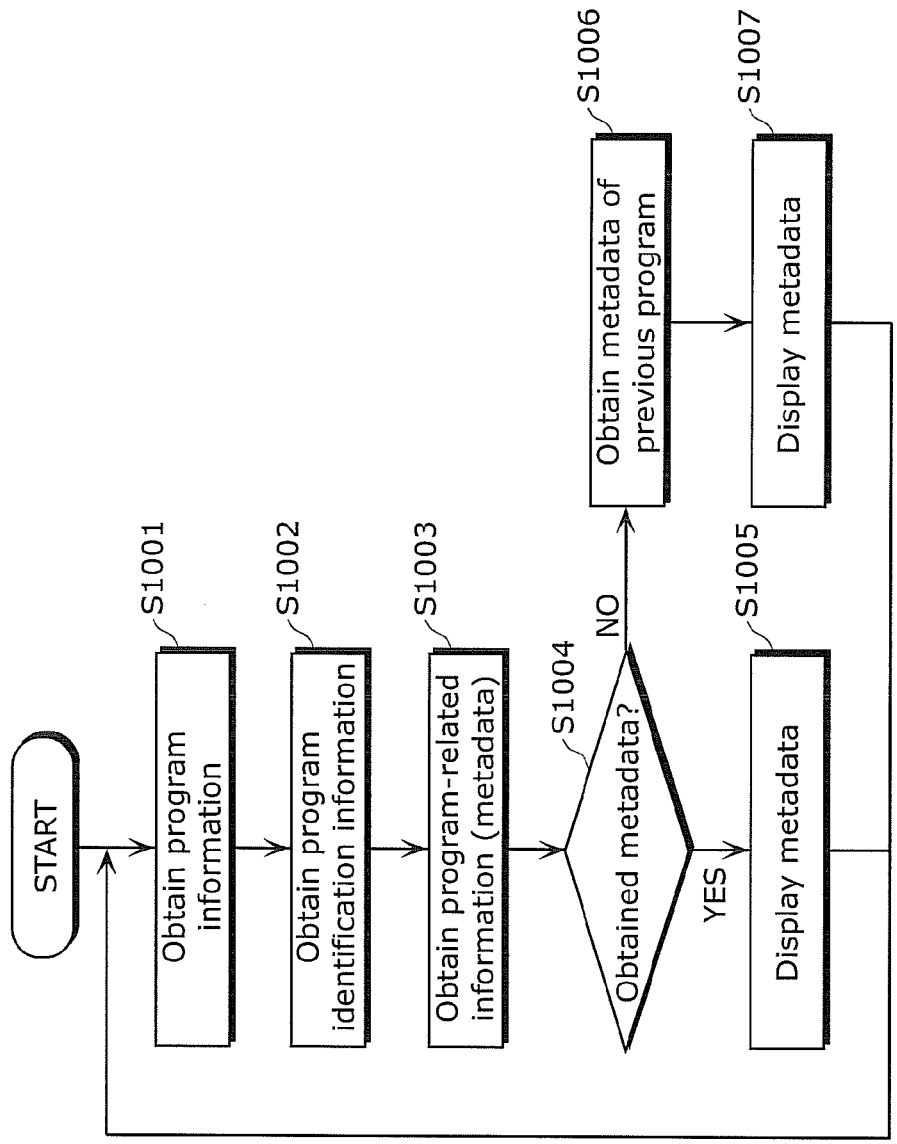

Normal display

Display after
video program change

INFORMATION DISPLAY DEVICE

CROSS REFERENCE TO RELATED APPLICATIONS

This is a continuation application of PCT International Application No. PCT/JP2012/006199 filed on Sep. 27, 2012, designating the United States of America, which is based on and claims priority of Japanese Patent Application No. 2012-038461 filed on Feb. 24, 2012. The entire disclosures of the above-identified applications, including the specifications, drawings and claims are incorporated herein by reference in their entirety.

FIELD

The present disclosure relates to an information display device which displays information related to a television (TV) program.

BACKGROUND

Patent Literature (PTL) 1 discloses receiving metadata related to broadcast content such as a TV program or a commercial message (CM), and providing a display screen on which information is easily viewed.

CITATION LIST

Patent Literature

[PTL 1] Japanese Unexamined Patent Application Publication No. 2011-91675

SUMMARY

Technical Problem

However, metadata related to a TV program (program-related information) may be distributed later than, for example, the actual broadcast time of the TV program. No information being displayed on the display screen might cause user stress.

In view of the above, the present disclosure provides an information display device which alleviates user stress even when no program-related information corresponding to a video program is available.

Solution to Problem

An information display device according to the present disclosure includes: a display unit; an obtaining unit which obtains a program-related information item following a video program displayed on a video display device, the program-related information item being related to the video program; and a control unit which causes the display unit to display the program-related information item obtained by the obtaining unit. When the obtaining unit is unable to obtain a first program-related information item following a first video program currently displayed on the video display device, the control unit causes the display unit to display a second program-related information item or a third program-related information item, the first program-related information item being related to the first video program, the second program-related information item being distributed before the first video program is displayed on the video display device, the third program-related information item being related to a second video program displayed on the video display device before the first video program is displayed on the video display device.

Advantageous Effects

An information display device according to the present disclosure can alleviate user stress even when no program-related information corresponding to a video program is available.

BRIEF DESCRIPTION OF DRAWINGS

These and other objects, advantages and features of the invention will become apparent from the following description thereof taken in conjunction with the accompanying drawings that illustrate a specific embodiment of the present disclosure.

FIG. 5 shows an example of program identification information according to Embodiment 1.

FIG. 6 shows an example of program-related information according to Embodiment 1.

FIG. 8 shows an example of timing at which program-related information can be obtained when a video program currently watched by a user is changed.

FIG. 10 is a flowchart for explaining a flow of mobile terminal control according to Embodiment 1.

DESCRIPTION OF EMBODIMENTS

How the Present Disclosure was Achieved

With use of the technique disclosed in PTL 1, it is possible to receive metadata related to broadcast content such as a TV program or CMs (program-related information) and provide a display screen on which information is easily viewed.

The metadata (program-related information), however, is not always transmitted at the exact same timing as the actual TV program broadcast. The metadata (program-related information) may be distributed with a certain amount of delay from the actual TV program broadcast.

More specifically, when metadata (program-related information) related to a TV program is distributed with a temporal delay from the actual TV program broadcast or the like, no metadata may be available for display till the metadata is distributed. No information being displayed on the display screen might cause user stress.

In view of the above, the present disclosure provides an information display device which alleviates user stress even when no program-related information corresponding to a video program is available.

The following describes details of embodiments with reference to the drawings as appropriate. However, there is a case where unnecessarily detailed descriptions are omitted. For example, there is a case where detailed descriptions on already well-known matters and overlapping explanations on substantially the same configurations are omitted. This is to prevent the following descriptions from being unnecessarily redundant and make it easier for a person skilled in the art to understand the following descriptions.

It is to be noted that the inventors provide the accompanying Drawings and the following descriptions so that a person skilled in the art sufficiently understands exemplary embodiments of the present disclosure, and therefore do not intend to limit the subject matter of the appended Claims and their equivalents.

Embodiment 1

With reference to FIGS. 1 to 10, Embodiment 1 is described below.

[1-1. Configuration]

Figure 1:
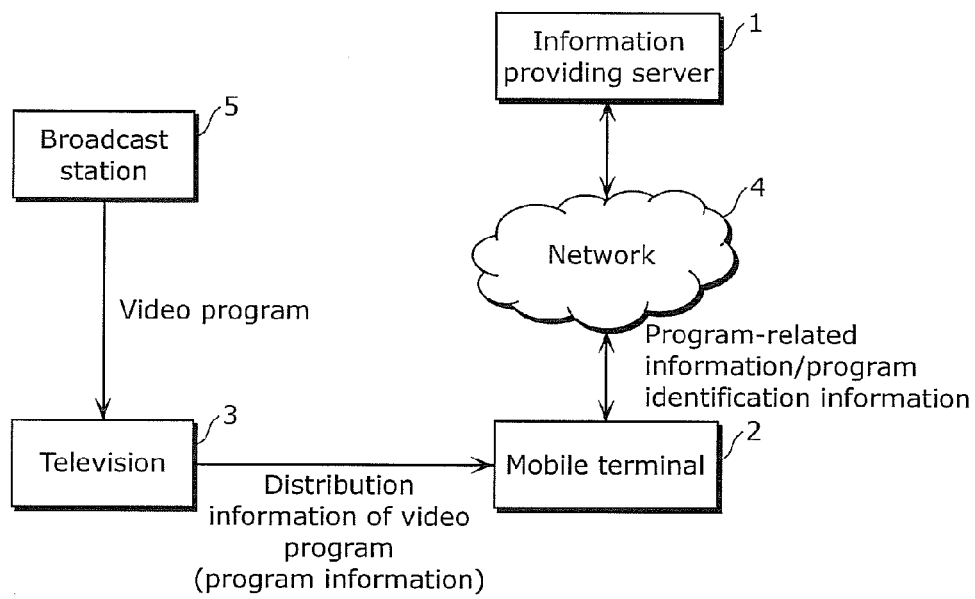
FIG. 1 shows a configuration example of a program-related information providing system according to Embodiment 1.
Figure 2A:
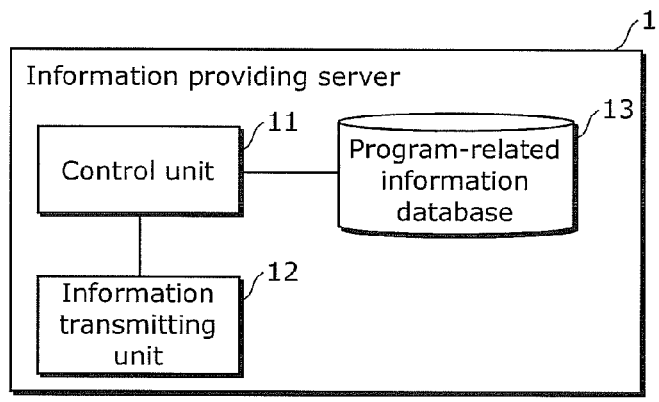
FIG. 2A is a block diagram showing a configuration of an information providing server according to Embodiment 1.
Figure 2B:
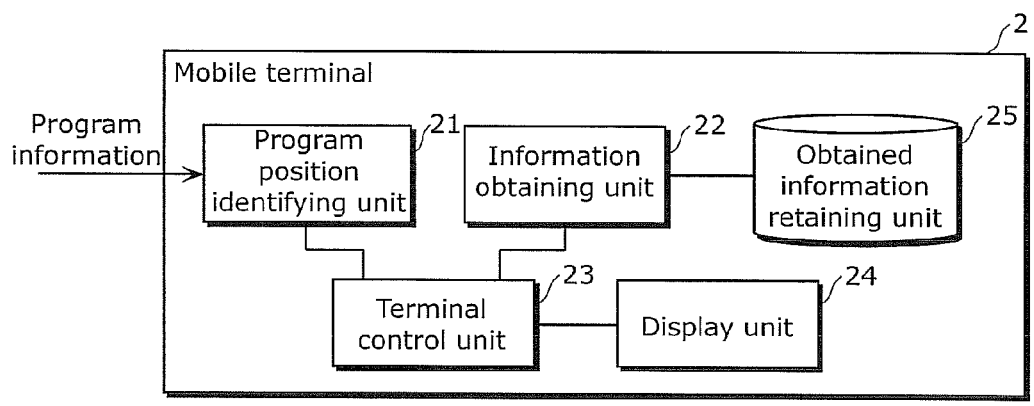
FIG. 2B is a block diagram showing a configuration of a mobile terminal according to Embodiment 1.
Figure 2C:
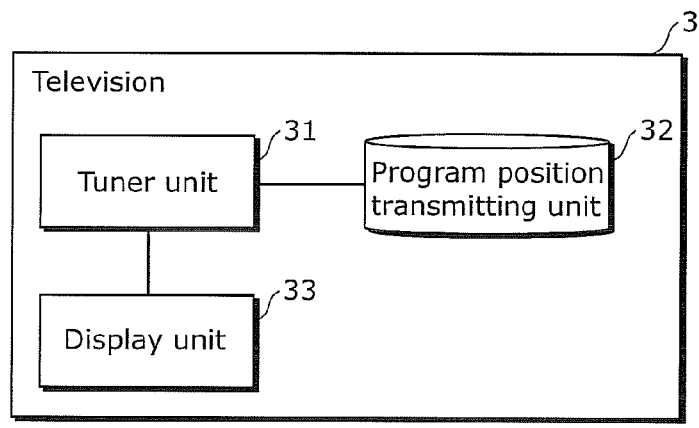
FIG. 2C is a block diagram showing a configuration of a television according to Embodiment 1.
Figure 3:
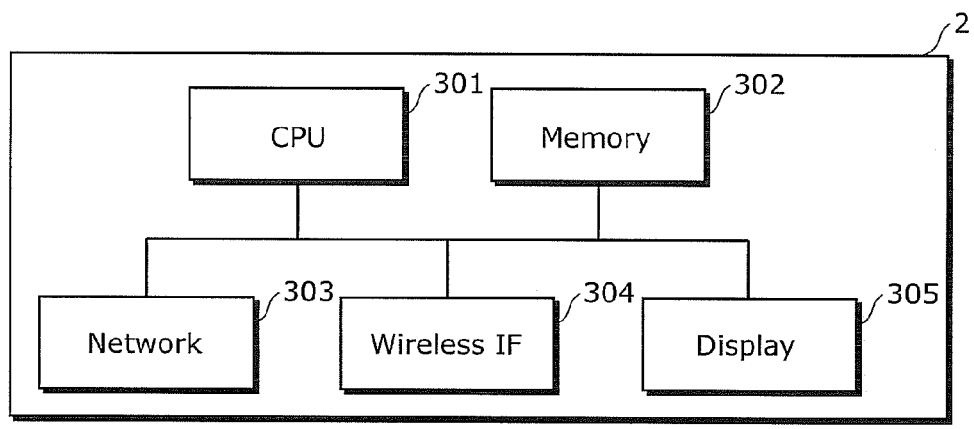
FIG. 3 shows a hardware configuration of the mobile terminal according to Embodiment 1.

FIG. 1 shows a configuration example of a program-related information providing system according to Embodiment 1. FIG. 2A is a block diagram showing a configuration of an information providing server according to Embodiment 1. FIG. 2B is a block diagram showing a configuration of a mobile terminal according to Embodiment 1. FIG. 2C is a block diagram showing a configuration of a television according to Embodiment 1. FIG. 3 shows an example of a hardware configuration of the mobile terminal.

The program-related information providing system shown in FIG. 1 includes an information providing server 1, a mobile terminal 2, a television 3, a network 4, and a broadcast station 5.

The network 4 is a communication medium for connecting the mobile terminal 2 and the information providing server 1.

The broadcast station 5 is a distribution source which distributes a video program to be displayed on the television 3. In Embodiment 1, a broadcast station is cited as an example, which example is intended to be illustrative and not restrictive. Any which transmits a video program to the television 3 may be used such as not only the broadcast station 5, but also a distribution station of a cable television, a video-on-demand server, and the like.

The information providing server 1 provides information for identifying a video program currently displayed on the television 3 or the like (program identification information), and program-related information related to a video program such as a television program which is broadcast (metadata). In response to a providing request of program identification information and program-related information from the mobile terminal 2 or the like, the information providing server 1 transmits the program identification information and the program-related information to the mobile terminal 2 or the like.

The "program-related information (metadata)" in the following embodiments refers to information related to a video program. For example, in the case where a human such as an actor/actress is displayed in a video program currently displayed on the television 3, the program-related information includes various information on this actor/actress (e.g., his or her profile such as birth date, sex, filmography, and acting carrier, and news related to the actor/actress). Furthermore, in the case where a commodity is displayed in the video program, for example, the program-related information includes information on the commodity (e.g., its manufacturer, sales agent, commodity price, URL for commodity introduction, and customer reviews on the commodity). The program-related information may be other than the above examples. In the case where the video program is a news program, for example, the program-related information may include information on the news (e.g., information such as the outline of the news, the subject of the news, related news, and public reputations of the news).

In short, the program-related information (metadata) means information on a displayed matter or a topic dealt with in the video program as well as indirect content related to such a matter or topic.

Furthermore, as shown in FIG. 2A, the information providing server 1 includes a control unit 11, an information transmitting unit 12, and a program-related information database 13.

The control unit 11 controls the whole information providing server 1. In addition, when receiving, from the mobile terminal 2, program information such as information on the broadcast station and display day and time of a video program, or a providing request of program-related information, the control unit 11 provides control for transmission of program identification information corresponding to the program information and/or program-related information of the video program.

The information transmitting unit 12 transmits, to the mobile terminal 2, the program identification information and/or program-related information obtained by the control unit 11 from the program-related information database 13.

The program-related information database 13 records or retains information for identifying each video program (program identification information) and program-related information related to each video program.

The mobile terminal 2 is an example of an information display device and receives program identification information and program-related information (metadata) from the information providing server 1 and displays the received information to a user.

As shown in FIG. 2B, the mobile terminal 2 includes a program position identifying unit 21, an information obtaining unit 22, a terminal control unit 23, a display unit 24, and an obtained information retaining unit 25. Here, the mobile terminal 2 may either be physically directly connected to the information providing server 1 via the network 4 or connected thereto with one or more devices interposed among the network 4.

The program position identifying unit 21 obtains, for example, program information of a video program currently watched by the user on the television 3 by communicating with the television 3. Examples of the program information of the video program include the broadcast station (distribution source) of the video program and a program position including the display day and time of the video program. The program position identifying unit 21 obtains program information through wireless communication or wired communication with the television 3.

The information obtaining unit 22 obtains (receives) program identification information and program-related information (metadata) from the information providing server 1 via the network 4. The information obtaining unit 22 obtains, for example, program-related information related to the video program displayed on the television following the video program. Moreover, for example, when the information obtaining unit 22 is unable to obtain program-related information (first program-related information) related to the video program (a first video program) displayed on the television 3 following the video program (the first video program), the information obtaining unit 22 obtains again program-related information (second program-related information) distributed before the first video program is displayed on the television 3 or program-related information (third program-related information) related to the video program (a second video program) displayed before the first video program is displayed on the television 3.

The terminal control unit 23 controls the whole mobile terminal 2. For example, the terminal control unit 23 causes the information obtaining unit 22 to obtain program-related information, or causes the display unit 24 to display information. In other words, the terminal control unit 23 causes the display unit 24 to display the program-related information obtained by the information obtaining unit 22. More specifically, when the information obtaining unit 22 is unable to obtain the first program-related information related to the first video program displayed on the television 3 following the first video program, the terminal control unit 23 causes the display unit 24 to display the second program-related information distributed before the first video program is displayed on the television 3 or the third program-related information related to the second video program displayed before the first video program is displayed on the television 3.

The display unit 24 displays the program identification information and/or the program-related information to be displayed under the control of the terminal control unit 23. The display unit 24 includes a first number of display areas for displaying the program-related information obtained by the information obtaining unit 22. The description of the display areas are not given here as it will be given later.

The obtained information retaining unit 25 records or retains the program identification information and the program-related information obtained by the information obtaining unit 22 from the information providing server 1. For example, the obtained information retaining unit 25 retains the second program-related information or the third program-related information obtained by the information obtaining unit 22 before the first video program is displayed on the television 3.

The mobile terminal 2 is, for example, implemented using hardware shown in FIG. 3. Specifically, the mobile terminal 2 is implemented in a hardware configuration which includes, as shown in FIG. 3, for example, a central processing unit (CPU) 301, a memory 302, a network interface 303, a wireless interface 304, and a display 305.

The CPU 301 controls the whole mobile terminal 2. Specifically, a part which provides such control is implemented using a software program which operates on the CPU 301, for example. The CPU 301 corresponds, for example, to the terminal control unit 23 or the like shown in FIG. 2B.

The memory 302 records data. The memory 302 records code for the above-mentioned software program which operates on the CPU 301, a temporary variable for use in operating the software program, the program identification information for identifying the program obtained from the information providing server 1, the program-related information and so on. It is to be noted that the memory 302 corresponds, for example, to the terminal control unit 23 or the obtained information retaining unit 25 shown in FIG. 2B.

The network interface 303 transmits and receives data to and from an external device connected thereto via a network. The network interface 303 corresponds, for example, to the information obtaining unit 22 shown in FIG. 2B.

The wireless interface 304 receives program information transmitted from the television 3. The program information including, for example, program position information including information on the broadcast station and the broadcast day and time of the currently watched video program. In Embodiment 1, a description is given of an example of a hardware configuration that uses wireless communication, but the present disclosure is not limited to the example. For example, wired communication may be used or information may be obtained from the television 3 using other methods.

The display 305 is a display device which displays the obtained program-related information and so on. The display 305 corresponds to the display unit 24 shown in FIG. 2B.

The television 3 is an example of a video display device which displays a video program, and is a device for enabling a user of the mobile terminal 2 to watch a video program. As shown in FIG. 2C, the television 3 includes a tuner unit 31, a program position transmitting unit 32, and a display unit 33.

The tuner unit 31 receives, demodulates, and converts the video program distributed from the broadcast station 5 so that the display unit 33 can display video.

The program position transmitting unit 32 identifies program information including, for example, the broadcast station and display day and time (program position) of the video program currently displayed on the display unit 33. The program information, which includes the broadcast station, the display day and time and so on, is transmitted to the mobile terminal 2 via wireless communication, wired communication, or the like.

The display unit 33 displays the video program obtained through the demodulation by the tuner unit 31 or the like.

In the program-related information providing system configured as above, a viewer of the television 3 watches the video program distributed from the broadcast station 5 on the television 3, and the mobile terminal 2 obtains the program identification information for identifying the program obtained from the information providing server 1. Moreover, the mobile terminal 2 obtains program-related information based on the program identification information, and displays the obtained information. This allows the viewer (user) to obtain detailed information about the content of interest in the video program currently watched on the television 3, with use of the mobile terminal 2.

[1-2. Operation]

Each operation of the program-related information providing system configured as above is described in detail below.

Figure 4:
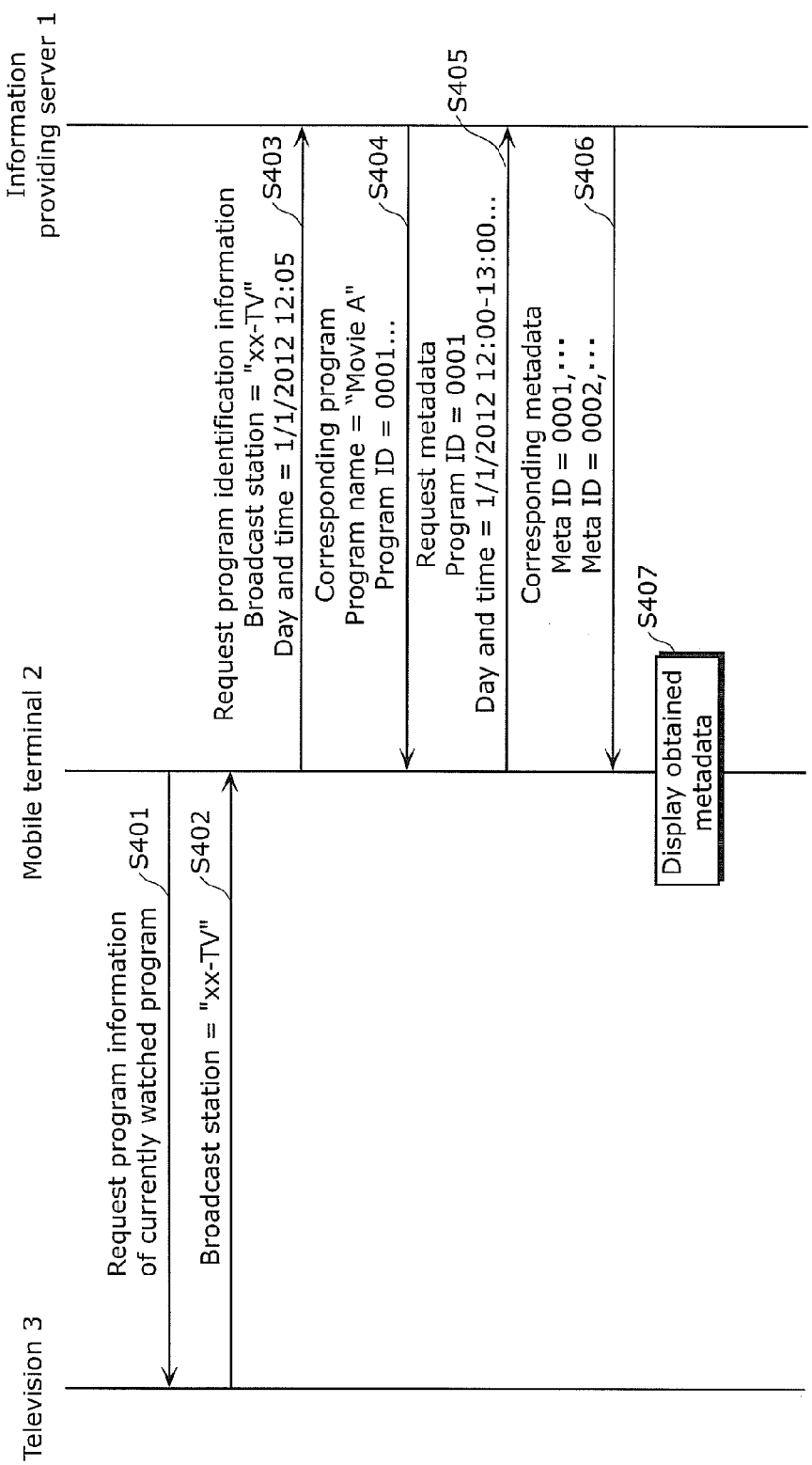
FIG. 4 is a sequence chart showing processing between the information providing server, the mobile terminal, and the television which are included in the program-related information providing system according to Embodiment 1.

FIG. 4 is a sequence chart showing a flow of processing between the information providing server 1, the mobile terminal 2, and the television 3 which are included in the program-related information providing system according to Embodiment 1.

Firstly, the program position identifying unit 21 of the mobile terminal 2 transmits a request signal to the program position transmitting unit 32 of the television 3. The request signal is for requesting program information including, for example, the broadcast station that distributes the video program currently displayed on the television 3, and the display day and time of the video program (program position) (S401).

Next, the program position identifying unit 21 receives, from the program position transmitting unit 32 of the television 3, the program information including, for example, the broadcast station that distributes the video program currently displayed on the television 3, and the display day and time of the video program (S402).

Next, the terminal control unit 23 of the mobile terminal 2 transmits, to the information providing server 1, the program information received by the program position identifying unit 21 (S403).

Next, on the basis of the received program information, the control unit 11 of the information providing server 1 searches the program-related information database 13 for information for identifying the video program corresponding to the received program information (program identification information), or obtains the program identification information. The control unit 11 then transmits the obtained program identification information to the mobile terminal 2 via the information transmitting unit 12. The information transmitting unit 12 transmits, to the mobile terminal 2, the program identification information searched for and obtained from the program-related information database 13 (S404).

Examples of the information for identifying a video program (program identification information) include a broadcast station (video distribution source), a program name, a watching position within the program (e.g., elapsed time from the start of the video program), broadcast day and time of the program (distribution day and time), and a chapter number within the program. In Embodiment 1, a description is given of an example where the above described information is obtained as the program identification information, but the present disclosure is not limited to the example. The program identification information may have a structure different from the above example as long as it identifies the program, a part of the program which is being watched, and so on.

FIG. 5 shows an example of the program identification information according to Embodiment 1. In the example shown in FIG. 5, the program identification information includes information about an ID, a program name, a broadcast station, a program starting day and time, a program ending day and time, and descriptions of program content (abstract). In other words, the information as shown in FIG. 5 is transmitted to and received from as the program identification information between the information providing server 1 and the mobile terminal 2.

Here, the ID refers to an identifier for identifying information identifying a video program. The program name is information such as characters indicating the name of a video program. The broadcast station is information for identifying the distribution source distributing the video program. The program starting day and time indicates the day and time at which distribution of the video program starts. The program ending day and time indicates the day and time at which distribution of the video program ends. The descriptions are information such as brief descriptions about the video program.

Now, a description is given referring back to FIG. 4.

Next, when the mobile terminal 2 obtains information for identifying the video program currently watched on the television 3 (program identification information) from the information providing server 1, the mobile terminal 2 obtains program-related information based on the program identification information. Specifically, the terminal control unit 23 of the mobile terminal 2 first transmits the obtained program identification information to the information providing server 1 (S405).

Next, on the basis of the transmitted program identification information, the control unit 11 of the information providing server 1 searches the program-related information database 13 for the program-related information (metadata) corresponding to the video program, or obtains the program-related information (metadata). The control unit 11 then transmits the program-related information to the mobile terminal 2 via the information transmitting unit 12 (S406).

FIG. 6 shows an example of the program-related information according to Embodiment 1. The program-related information includes, as shown in FIG. 6, for example, a meta ID, a program ID, a display day and time, a category, a title, descriptions, an image URL, and a linked URL.

Here, the meta ID is an identifier for identifying each program-related information. The program ID is an identifier for identifying a currently watched video program. The program ID may correspond to the ID shown in FIG. 5.

The display day and time is information indicating a point of time within the video program the program-related information relates to the video program. For example, in the case where the display day and time indicates 1/1/2012 and 12:05, the display day and time indicates the portion of the video program transmitted from the broadcast station or the like at 12:05 on Jan. 1, 2012. In Embodiment 1, the display day and time is indicated by absolute time, but the display day and time may be indicated by relative time from the start of the program. In other words, the display day and time may be indicated in any other ways as long as it identifies a portion within the program (temporal position) or the like (program position information).

The category indicates the category of the program-related information. The type of a category is determined according to the content of program-related information provided. The title is the name of the program-related information. For the title, an appropriate name is used which allows understanding of the outline of the content of the program-related information. The descriptions include detailed content of the program-related information. The content (information) included in the descriptions is generally indicated by a string of characters or the like.

The image URL is information indicating the information source which provides an image related to the program-related information. Accordingly, the mobile terminal 2 is capable of obtaining an image from the information source (designated URL) indicated by the image URL via the network 4 as necessary. The linked URL is information indicating the source of information related to the program-related information or the source of more detailed information which can be provided from other than the information providing server 1.

In Embodiment 1, a description is given of an example where the information as shown in FIG. 6 is provided as the program-related information, but the present disclosure is not limited to the example. The program-related information may include information other than that shown in FIG. 6, or may include only part of the information shown in FIG. 6.

Now, a description is given again referring back to FIG. 4.

Next, the mobile terminal 2 receives the program-related information (metadata) from the information providing server 1. The terminal control unit 23 of the mobile terminal 2 then displays the received program-related information (metadata) on the display unit 24 (S407).

In this way, in the program-related information providing system according to Embodiment 1, it is possible to cause the mobile terminal 2 to obtain the latest program-related information by repeating S401 to S407.

According to the progress of the video program distributed from the broadcast station, new program-related information is added momentarily to the program-related information database 13 of the information providing server 1. Hence, the mobile terminal 2 is able to obtain the latest program-related information by accessing the information providing server 1 several times.

Figure 7:
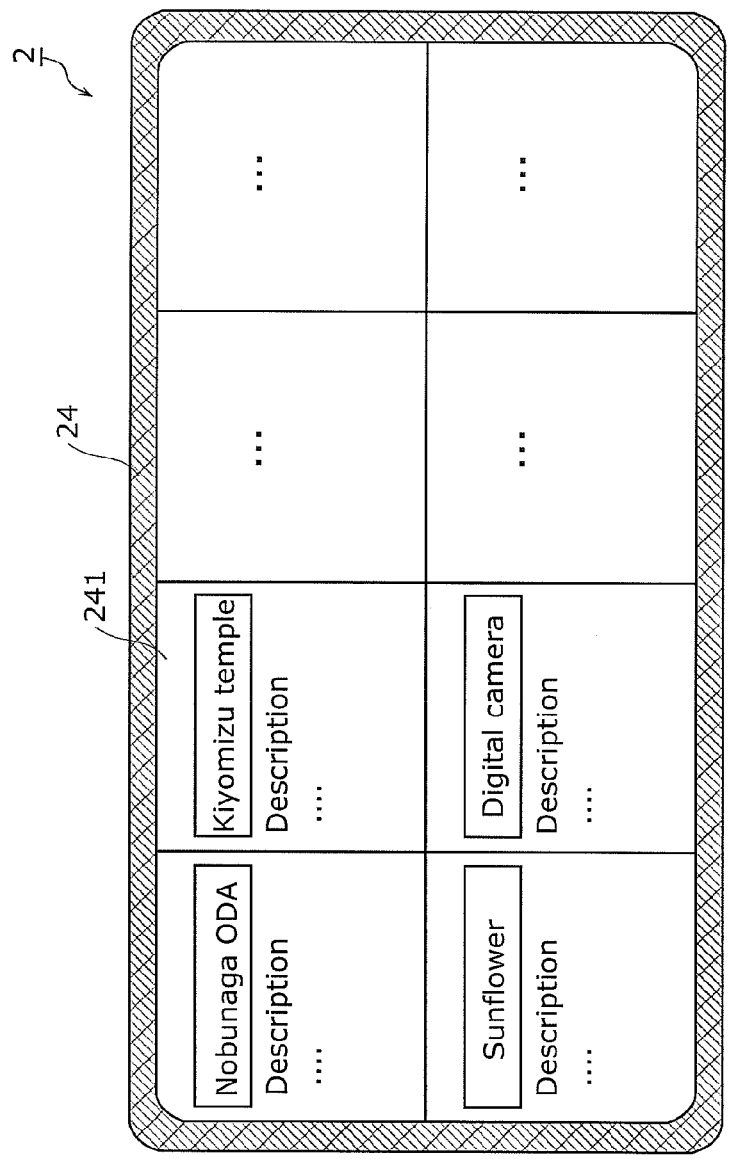
FIG. 7 shows an example where program-related information is displayed on a display unit of the mobile terminal according to Embodiment 1.

FIG. 7 shows an example where program-related information items are displayed on the display unit 24 (display 305) of the mobile terminal 2.

The display unit 24 is divided into a plurality of display areas (metadata display areas 241) as shown in FIG. 7. The display areas serve as the metadata display areas 241 each displaying a different program-related information item (metadata). In the example shown in FIG. 7, the display unit 24 includes eight (a first number of) metadata display areas 241 which are obtained by dividing the display unit 24 into two in the vertical direction and four in the horizontal direction. A description is given below of the case where eight (the first number of) metadata display areas are set as shown in FIG. 7; however, the manner of display (the number of metadata display areas, manner of division of the display unit 24, and the like) is not limited to the example shown in FIG. 7. The display unit 24 may adopt any display manners as long as the display unit 24 includes a plurality of metadata display areas 241.

When the mobile terminal 2 obtains the program-related information of the video program from the information providing server 1 and the number of the obtained program-related information items is greater than the number of program-related information items displayable on the display unit 24, the mobile terminal 2 preferentially displays the latest program-related information item among the obtained program-related information items (the program-related information having the latest display day and time in FIG. 6). The mobile terminal 2 may display the other program-related information items when a user inputs an operation through scrolling, book format or the like.

Referring to FIG. 8 to FIG. 10, a description is given below of an example where the information display device according to Embodiment 1 (the mobile terminal 2) displays program-related information (metadata) to a user even when no program-related information corresponding to the video program is available, so that user stress is alleviated.

FIG. 8 shows an example of timing at which program-related information can be obtained in the case where the video program currently watched by the user is changed.

In FIG. 8, (a) shows an example where the currently watched video program is changed into another one from Period B. In other words, in FIG. 8, (a) shows an example where "Movie A" is distributed from the broadcast station 5 to the television 3 in Period A, and "Drama B" is distributed from the broadcast station 5 to the television 3 in Periods B and C.

In FIG. 8, (b) shows an example of timing of transmission of program identification information from the information providing server 1. As shown in (b) in FIG. 8, the program identification information is substantially synchronous with "Movie A" and "Drama B" which are the video programs distributed from the broadcast station 5. In other words, when distribution of a video program ends and distribution of a new program starts, the program identification information is updated almost at the same time. This is because a video program distributed from the broadcast station 5 is predetermined, and the program identification information thereof can be updated along with the actual video distribution.

In FIG. 8, (c) shows an example of timing of transmission of program-related information from the information providing server 1. As shown in (c) in FIG. 8, contrary to the program identification information, there is a certain time difference between display timing of a video program and transmittable timing of program-related information (metadata) related to the video program. This is because program-related information starts to be generated automatically or manually from when broadcast of the video program starts, and is recorded onto the program-related information database 13. In other words, the above time difference is caused because it takes time till the program-related information is generated after start of the video program broadcast. Hence, the transmittable timing of the program-related information of a video program after changing of programs is delayed relative to the timing at which the video program after the change is displayed.

More specifically, in (a) in FIG. 8, when Period A ends and Period B starts, the video program displayed (watched) is changed from "Movie A" to "Drama B". However, at this point of change in time, only the program-related information of "Movie A" is transmittable, but the program-related information of "Drama B" is not yet transmittable.

When program-related information (metadata) related to a video program is distributed with a time lag relative to the actual broadcast of the video program as described above, the metadata related to the actual broadcast video program cannot be displayed till the metadata is distributed. This results in no information being displayed on the display screen, which is a cause of user stress.

In order to avoid causing such a stress, the mobile terminal 2 according to Embodiment 1 operates as below in Periods A to C.

Figure 9A:
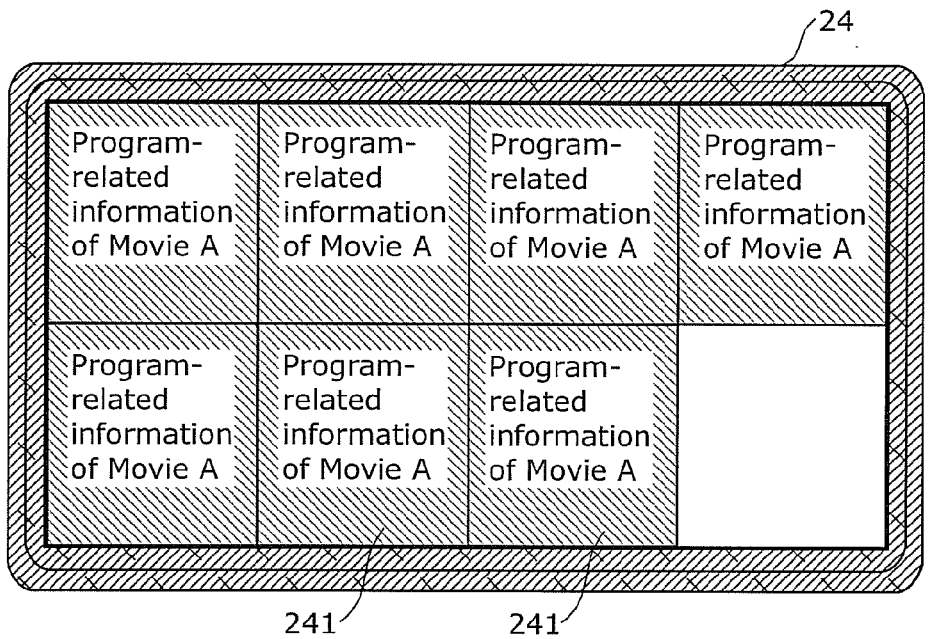
FIG. 9A shows a display example of the display unit of the mobile terminal according to Embodiment 1.
Figure 9B:
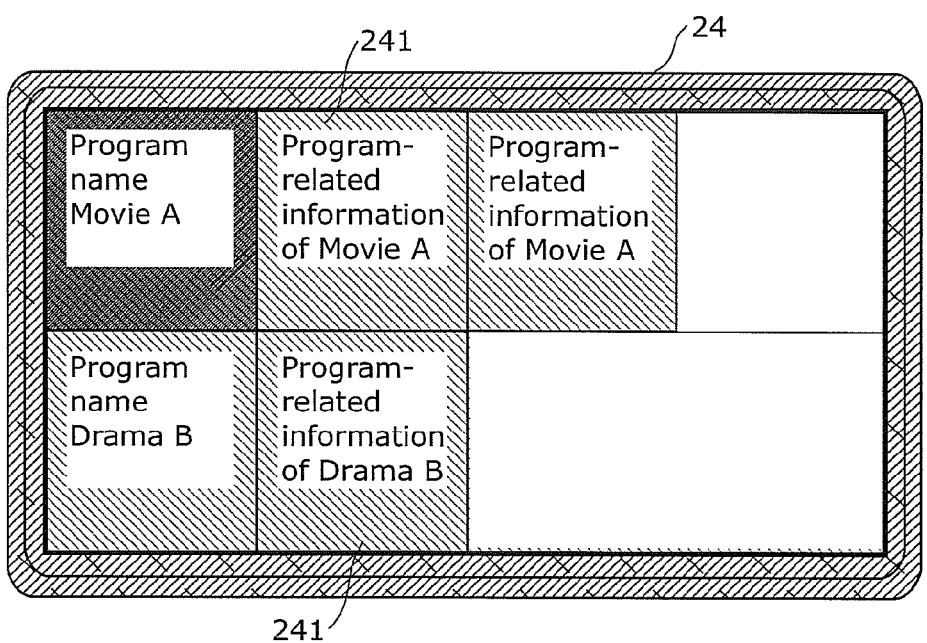
FIG. 9B shows another display example of the display unit of the mobile terminal according to Embodiment 1.
Figure 9C:
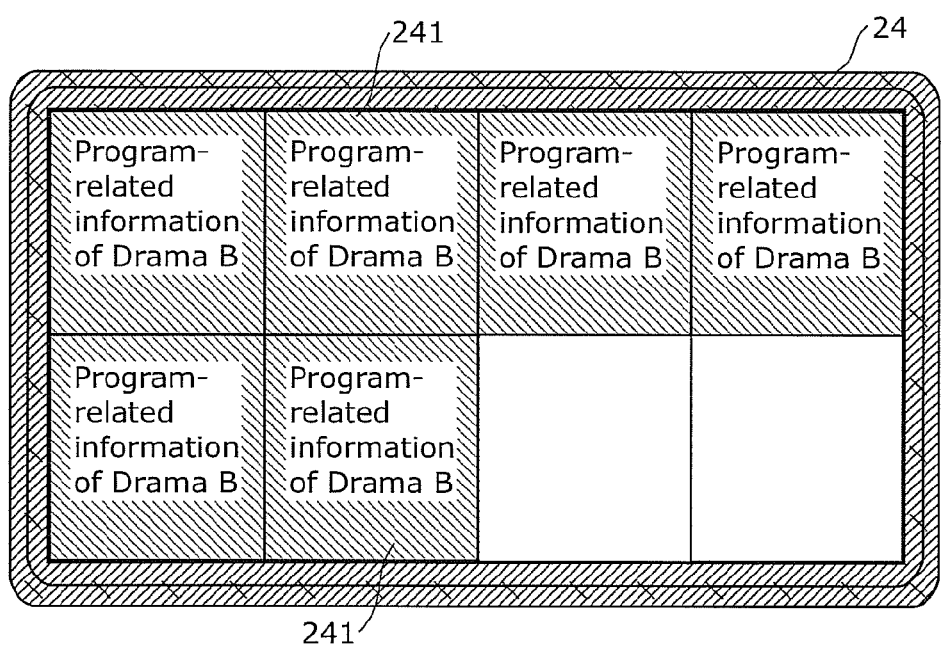
FIG. 9C shows another display example of the display unit of the mobile terminal according to Embodiment 1.

FIG. 9A to FIG. 9C show display examples of the display unit 24 of the mobile terminal 2 according to Embodiment 1. FIG. 9A shows a display example of the display unit 24 of the mobile terminal 2 in Periods A and B. FIG. 9B shows a display example of the display unit 24 of the mobile terminal 2 in the early period of Period C. FIG. 9C shows a display example of the display unit 24 of the mobile terminal 2 after an elapse of a predetermined period in Period C.

Firstly, in Periods A and B shown in FIG. 8, all of the program-related information items received by the mobile terminal 2 are about "Movie A". Hence, as shown in FIG. 9A, the display unit 24 displays only the program-related information items of "Movie A".

Next, in a predetermined period when Period C starts after Period B (in the early period of Period C) shown in FIG. 8, the display unit 24 displays both the program-related information of "Movie A" and the program-related information of "Drama B", as shown in FIG. 9B. Immediately after the change from Period B to Period C and for a predetermined Period after that (the early period of Period C), the mobile terminal 2 has not yet obtained a sufficient number of program-related information items of "Drama B". Hence, the mobile terminal 2 displays, on the display unit 24, not only the program-related information of "Drama B" that is currently watched but also the program-related information of "Movie A" of Period A that was watched or the like immediately before Drama B.

In this way, even when a sufficient number of program-related information items of the currently watched video program is unavailable, the user of the mobile terminal 2 can view the program-related information of the video program watched immediately before the current program.

Accordingly, it is possible to avoid causing user stress when there is no information being displayed on the display screen just because no metadata related to the actual broadcast of the video program or the like can be displayed.

When the program-related information items of "Drama B", which is the program currently watched, and "Movie A", which is a problem previously watched (past program), are displayed on the mobile terminal 24, it is preferable to explicitly display the information items so that the two types of information items can be distinguished from each other as shown in FIG. 9B. In the example shown in FIG. 9B, the top column on the display screen of the display unit 24 shows the program-related information items of "Movie A", and the bottom column shows the program-related information items of Drama B.

Next, when a predetermined period elapses in Period C, all of the program-related information items transmitted to the mobile terminal 2 are the program-related information items of "Drama B". Hence, as shown in FIG. 9C, the display unit 24 shows only the program-related information items of "Drama B".

Referring to FIG. 10, a description is given below of the flow of control of the mobile terminal 2 operated as above.

FIG. 9A to FIG. 9C show examples of the case where some kind of program-related information is displayed on the display unit 24. In other words, the examples indicate that not all of display areas (the metadata display areas 241) of the display unit 24 need to display program-related information.

FIG. 10 is a flowchart for explaining a flow of control of the mobile terminal 2 according to Embodiment 1.

Firstly, the terminal control unit 23 obtains program information from the program position identifying unit 21 to identify the video program currently watched by the viewer on the television 3 (S1001). The program information includes the broadcast station which distributes the video program currently displayed on the television 3 and the display day and time of the video program.

Next, the terminal control unit 23 transmits, to the information providing server 1, the program information obtained by the program position identifying unit 21 and including the broadcast station and the display day and time of the video program. The terminal control unit 23 then obtains, from the information providing server 1 via the information obtaining unit 22, information for identifying the program currently watched by the viewer on the television 3 (program identification information) (S1002).

Next, the terminal control unit 23 transmits the obtained program identification information to the information providing server 1 (S1003).

Next, the terminal control unit 23 determines whether or not program-related information (metadata) of the video program relative to the program identification information transmitted in S1003 has been obtained (S1004). When the program-related information has been obtained, the terminal control unit 23 proceeds to S1005. On the other hand, when the program-related information has not been obtained, the terminal control unit 23 proceeds to S1006.

When it is determined in S1004 that the program-related information relative to the transmitted program identification information has been obtained (Yes in S1004), the terminal control unit 23 causes the display unit 24 to display the program-related information (S1005).

On the other hand, when it is determined in S1004 that the program-related information relative to the transmitted program identification information has not been obtained (No in S1004), the terminal control unit 23 obtains the program-related information distributed immediately before (S1006).

The terminal control unit 23 then causes the display unit 24 to display the obtained program related information related to a video program that is different from the currently watched video program (S1007).

A description has been given of the case where program-related information distributed immediately before the currently watched video program is obtained when the program-related information corresponding to the currently watched video program cannot be obtained. However, the present disclosure is not limited to the example. For example, when the program-related information of the currently watched video program cannot be obtained, the terminal control unit 23 may obtain the program-related information of another video program previously watched by the viewer on the television 3, obtained by the mobile terminal 2 and recorded and retained in the obtained information retaining unit 25.

Then, the processing returns to S1001, and the above processing is repeated.

In such a manner, the mobile terminal 2 displays the program-related information of another program till the program-related information of the video program currently watched on the television 3 is obtained. Here, the another program may be a video program distributed from the same broadcast station immediately before the current video program, or a video program previously watched by the viewer and retained in the obtained information retaining unit 25 or the like.

[1-3. Advantageous Effects, Etc.]

As above, the information display device (the mobile terminal 2) according to Embodiment 1 includes: the program position identifying unit 21 which obtains, from the video display device (the television 3), program information including the distribution source, the display day and time, and the like of the video program displayed on the video display device (the television 3); the information obtaining unit 22 which transmits the obtained program information to an external server (such as the information providing server 1), obtains information for identifying the video program displayed on the video display device (program identification information), transmits the program identification information to the external server (such as the information providing server 1), and obtains the program-related information of the video program; and the terminal control unit 23 which causes the display unit 24 to display the obtained program-related information.

The information display device (the mobile terminal 2) need not include all of the above structural elements, but may include at least the following structural elements. Specifically, the information display device (the mobile terminal 2) at least includes: a display unit (the display unit 24); an obtaining unit (the information obtaining unit 22) which obtains program-related information related to the video program displayed on the video display device (the television 3) following the video program; a control unit (the terminal control unit 23) which causes the display unit (the display unit 24) to display the program-related information obtained by the obtaining unit (the information obtaining unit 22). When the obtaining unit (the information obtaining unit 22) is unable to obtain first program-related information related to a first video program currently displayed on the video display device (the television 3) following the first video program, the control unit (the terminal control unit 23) causes the display unit (the display unit 24) to display second program-related information distributed before the first video program is displayed on the video display device (the television 3) or third program-related information related to a second video program displayed on the video display device (the television 3) before the first video program is displayed on the video display device (the television 3).

With such a structure, even when the information display device (the mobile terminal 2) is unable to obtain the program-related information of the video program currently displayed on the video display device in real time following the video program, the information display device (the mobile terminal 2) is capable of displaying the program-related information of the video program distributed immediately before or the video program reproduced on the video display device (the television 3).

Accordingly, even when the program-related information (metadata) corresponding to a video program is not distributed, the user of the information display device can view the program-related information (metadata) of another program and the like.

In other words, even when no program-related information corresponding to a video program is being distributed, some kind of program-related information (metadata) can be displayed to the viewer. Hence, even when program-related information (metadata) related to a video program is distributed with a time lag relative to the actual video program broadcast, it is possible to avoid causing user stress when there is no metadata relative to the actual video program broadcasting being displayed till the actual distribution of the metadata.

Moreover, it may be that the display unit includes a first number of display areas for displaying the program-related information item obtained by the obtaining unit, and when the obtaining unit obtains a second number of the first program-related information items following the first video program, the control unit causes the display unit to display each of the second number of the first program-related information items in a different one of the second number of the display areas, and displays the second program-related information item or the third program-related information item in one or more remaining display areas obtained by subtracting the second number of the display areas from the first number of the display areas, the second number being less than the first number.

With such a configuration, when a sufficient number of program-related information items cannot be obtained relative to the size of the display unit (the display unit 24) (the number of regions that can display program-related information), the display unit (the display unit 24) can simultaneously display the program-related information of the currently watched video program and the program-related information of the video program distributed before the current video program or the video program reproduced on the video display device (the television 3) before the current video program.

With this, it is possible not only to provide a larger number of program-related information items to the user, but also to avoid causing user stress when there is no program-related information about the actual broadcasted video program being displayed on the display screen till distribution of a sufficient number of program-related information items relative to the size of the display area (the number of areas on which the program-related information items can be displayed).

Here, it may be that the information display device further includes an obtained information retaining unit which retains the second program-related information item or the third program-related information item obtained by the obtaining unit before the first video program is displayed on the video display device, and when the obtaining unit is unable to obtain the first program-related information item following the first video program, the control unit causes the display unit to display the second program-related information item or the third program-related information item retained in the obtained information retaining unit.

With this configuration, when the control unit (the terminal control unit 23) is unable to obtain the program-related information of the video program currently displayed on the video display device (the television 3), the control unit (the terminal control unit 23) is able to obtain, through an external server (the information providing server 1) or the like, the program-related information of the video program distributed before the currently displayed video program and display the obtained information on the display unit. For example, when the channel of the broadcast station of the video display device is changed, the control unit obtains and display the program-related information previously distributed on the channel before the change.

Furthermore, it may be that when the obtaining unit is unable to obtain the first program-related information following the first video program, the obtaining unit externally obtains the second program-related information item or the third program-related information item.

In other words, in this configuration, the obtained program-related information is retained in the obtained information retaining unit. Accordingly, the control unit (the terminal control unit 23) is able to obtain the program-related information stored in the obtained information retaining unit and displays the obtained information on the display unit.

As described, the program-related information displayed on the display unit by the information display device (the mobile terminal 2) according to Embodiment 1 may be the program-related information of the video program distributed immediately before or the video program reproduced on the video display device (the television 3). These program-related information items may be obtained by the obtaining unit (the information obtaining unit 22) from the external server or the like again, or retained in the obtained information retaining unit in advance.

Accordingly, even when the mobile terminal 2 is unable to obtain the program-related information of the currently watched video program, the mobile terminal 2 obtains the program-related information of another video program, and displays the obtained information. In this case, the user of the mobile terminal 2 can view the program-related information of the other video program till the program-related information of the currently watched video program is obtained. When the program-related information of the current video program is obtained, display is updated with the obtained program-related information; and thus, the viewer can avoid missing the program-related information of the current program.

Embodiment 2

An example different from the program-related information providing system described in Embodiment 1 is described below with reference to FIGS. 11 and 12 as Embodiment 2.

[2-1. Configuration]

Figure 11:
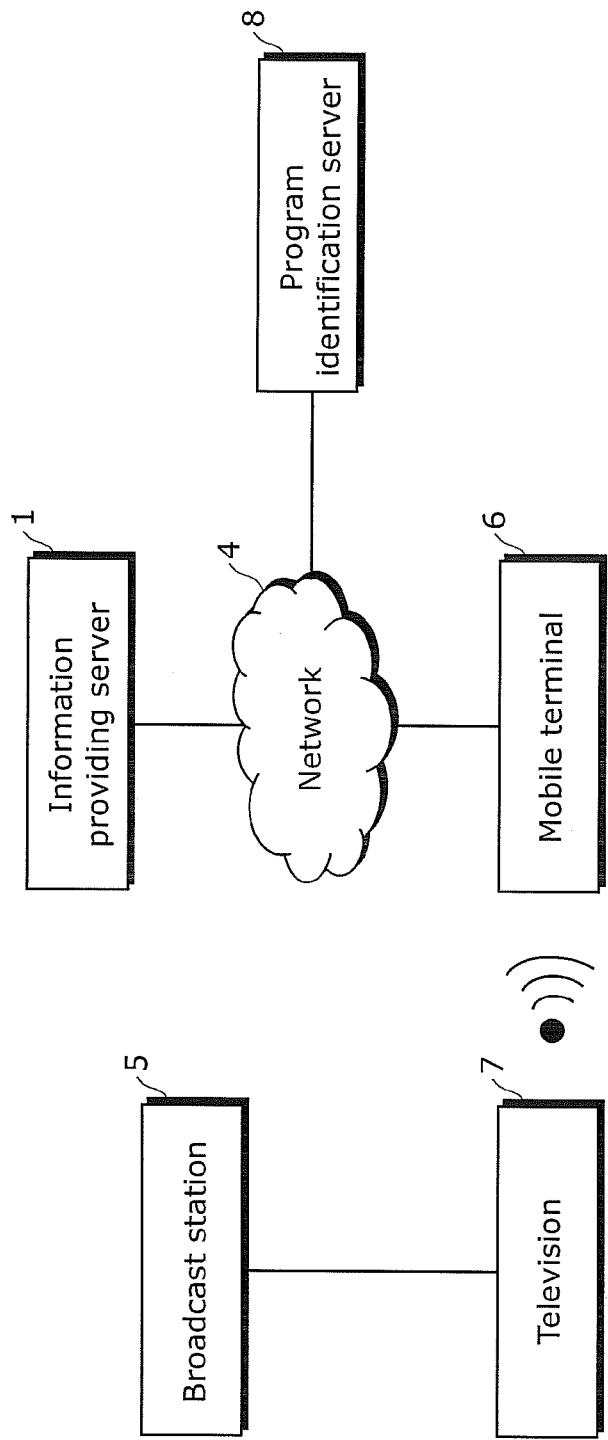
FIG. 11 shows a configuration example of a program-related information providing system according to Embodiment 2.
Figure 12:
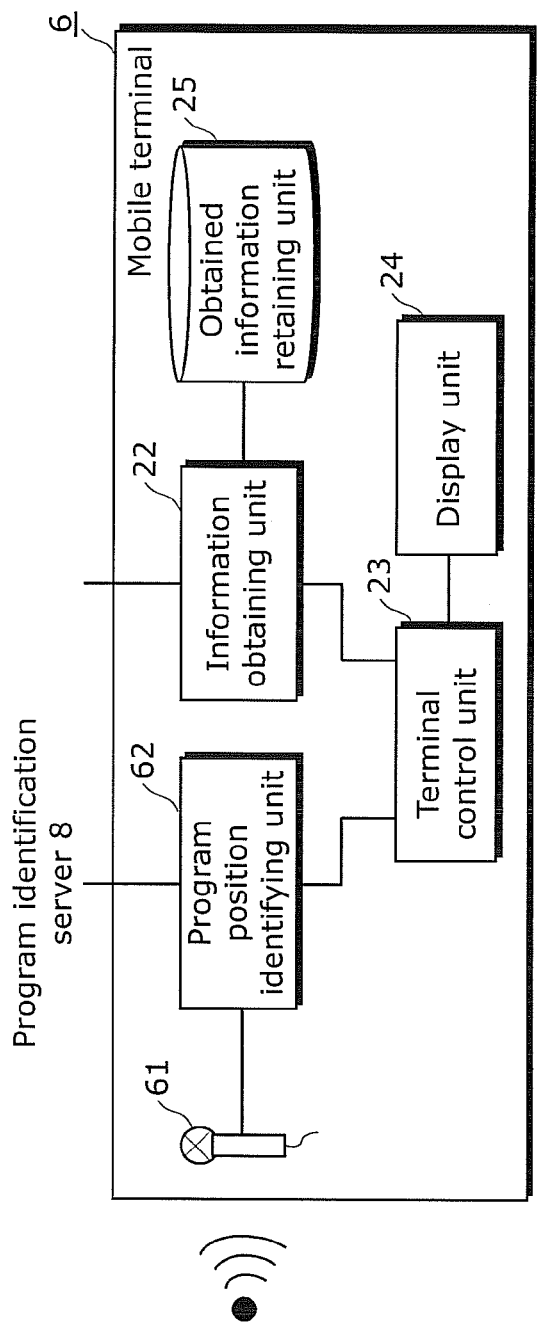
FIG. 12 is a block diagram showing a configuration of a mobile terminal according to Embodiment 2.

FIG. 11 shows a configuration example of the program-related information providing system according to Embodiment 2. FIG. 12 is a block diagram showing a configuration of a mobile terminal according to Embodiment 2. The program-related information providing system (FIG. 11) according to Embodiment 2 and the program-related information providing system (FIG. 1) described in Embodiment 1 have the following two differences. The differences are (i) the method in which the mobile terminal 6 (the mobile terminal 2) obtains information of the video program currently displayed on the television 7 (the television 3) and (ii) the fact that the server that the mobile terminal 6 asks about program identification information is the program identification server 8 that is independent from the information providing server 1. The other points are the same as those according to Embodiment 1 and therefore are not described here.

The mobile terminal 6 is an example of the information display device and includes an information obtaining unit 22, a terminal control unit 23, a display unit 24, an obtained information retaining unit 25, a microphone 61, and a program position identifying unit 62.

The information obtaining unit 22, the terminal control unit 23, the display unit 24, and the obtained information retaining unit 25 are the same as those in Embodiment 1 and therefore are not described here.

The microphone 61 obtains audio outputted from the television 7 which displays a video program. Specifically, the microphone 61 obtains audio outputted when the television 7 displays the video program, and converts the obtained audio into an electric signal. The microphone 61 then outputs the converted audio electric signal to the program position identifying unit 62.

The program position identifying unit 62 identifies the video program from the audio obtained by the microphone 61. Specifically, the program position identifying unit 62 carries out an operation on the audio electric signal provided from the microphone 61, through predetermined processing. As a result, the program position identifying unit 62 obtains program information such as the broadcast station and the display day and time of the video program currently displayed on the television 7.

The program position identifying unit 62 transmits the identified program information, such as the broadcast station and the display day and time of the video program, to the program identification server 8. The program identification server 8 has part of the functions of the information providing server 1 described in Embodiment 1. Specifically, the program identification server 8 returns the information for identifying the video program currently displayed on the television 7 (program identification information) to the mobile terminal 6 based on the program information such as the broadcast station and the display day and time.

In such a manner, the mobile terminal 6 can identify the video program currently displayed on the television 7. The other points including the operations are the same as those in Embodiment 1, and therefore are not described here.

[2-2. Advantageous Effect, Etc.]

As described, in Embodiment 2, the information display device (the mobile terminal 6) further includes the microphone 61 which obtains audio outputted from the video display device (the television 7 or the like). The program position identifying unit 62 obtains, from the video display device (the television 7 or the like), the program information such as the distribution source and the display day and time of the video program currently displayed on the video display device (the television 7 or the like). The program position identifying unit 62 transmits the obtained program information to an external server (the program identification server 8 or the like), and obtains information for identifying the video program displayed on the video display device (the television 7 or the like) (program identification information).

With this, even when the video display device (the television 7 or the like) is unable to transmit program information such as the distribution source (broadcast station) or display day and time of the video program currently displayed on the video display device (the television 7 or the like) to the information display device (the mobile terminal 6) through wireless or wired communication, the information display device (the mobile terminal 6) can identify such program information.

As described above, according to Embodiment 2, even when the program-related information of the currently watched video program cannot be obtained, the information display device can display the program-related information of another program in a similar manner to Embodiment 1. Moreover, even when a video display device has no communication function, the information display device is able to obtain (determine) the program information such as distribution information of the video program displayed on the video display device.

Embodiment 3

An example different from the program-related information providing systems described in Embodiments 1 and 2 is described below with reference to FIG. 13 to FIG. 16C as Embodiment 3.

[3-1. Configuration]

Figure 13:
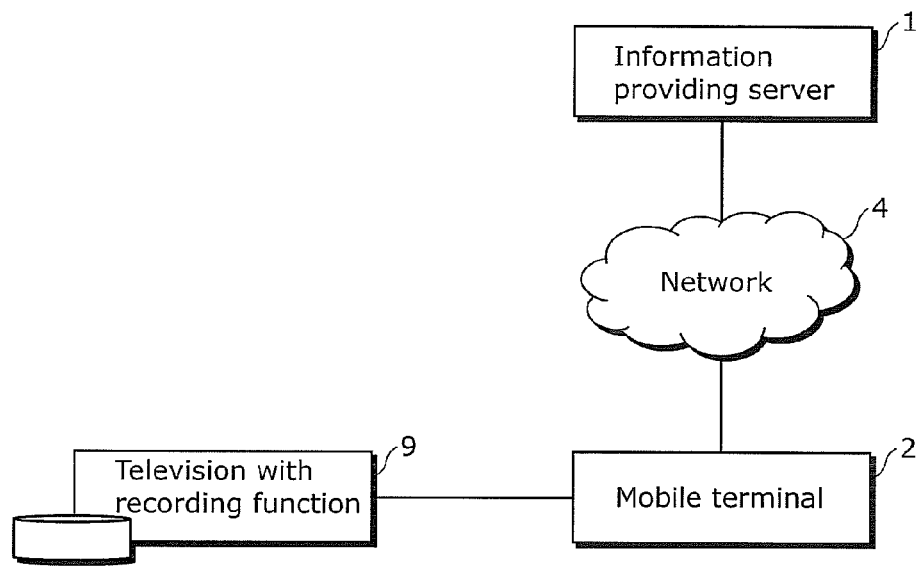
FIG. 13 shows a configuration example of a program-related information providing system according to Embodiment 3.
Figure 14:
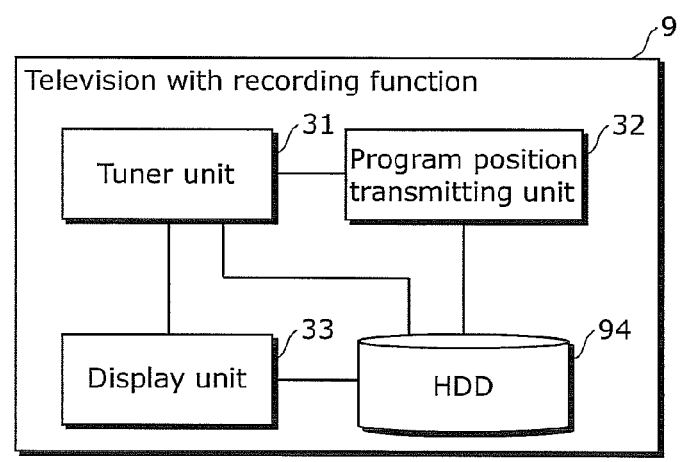
FIG. 14 shows a functional configuration of a television with a recoding function according to Embodiment 3.

FIG. 13 shows a configuration example of a program-related information providing system according to Embodiment 3. FIG. 14 is a diagram showing a functional configuration of a television with a recoding function according to Embodiment 3.

The program-related information providing system (FIG. 13) according to Embodiment 3 and the program-related information providing system (FIG. 1) according to Embodiment 1 have the following two differences. The differences are (i) that a television 9 with a recording function includes a video recorder (recording function) and (ii) that the program-related information providing system (FIG. 13) does not include the broadcast station 5 because the television 9 includes the recording function.

In Embodiment 3, a description is given mainly to the differences from Embodiment 1. The other points that are the same as those in Embodiment 1 are not described here.

Since the mobile terminal 2 is the same as that described in Embodiment 1, its description is not given here.

The television 9 with a recording function includes a function of recording and retaining video programs, in addition to a function of a video display device which displays video. As FIG. 14 shows, the television 9 with a recording function includes a tuner unit 31, a program position transmitting unit 32, a display unit 33, and a hard disk drive (HDD) 94. The television 9 with a recording function is different from the television 3 (FIG. 2C) described in Embodiment 1 in that the HDD 94 is included.

The HDD 94 is a storage medium in which video programs are recorded and retained. In Embodiment 3, a description is given of the HDD as an example, however, the HDD may be any non-volatile recording medium.

Figure 15:
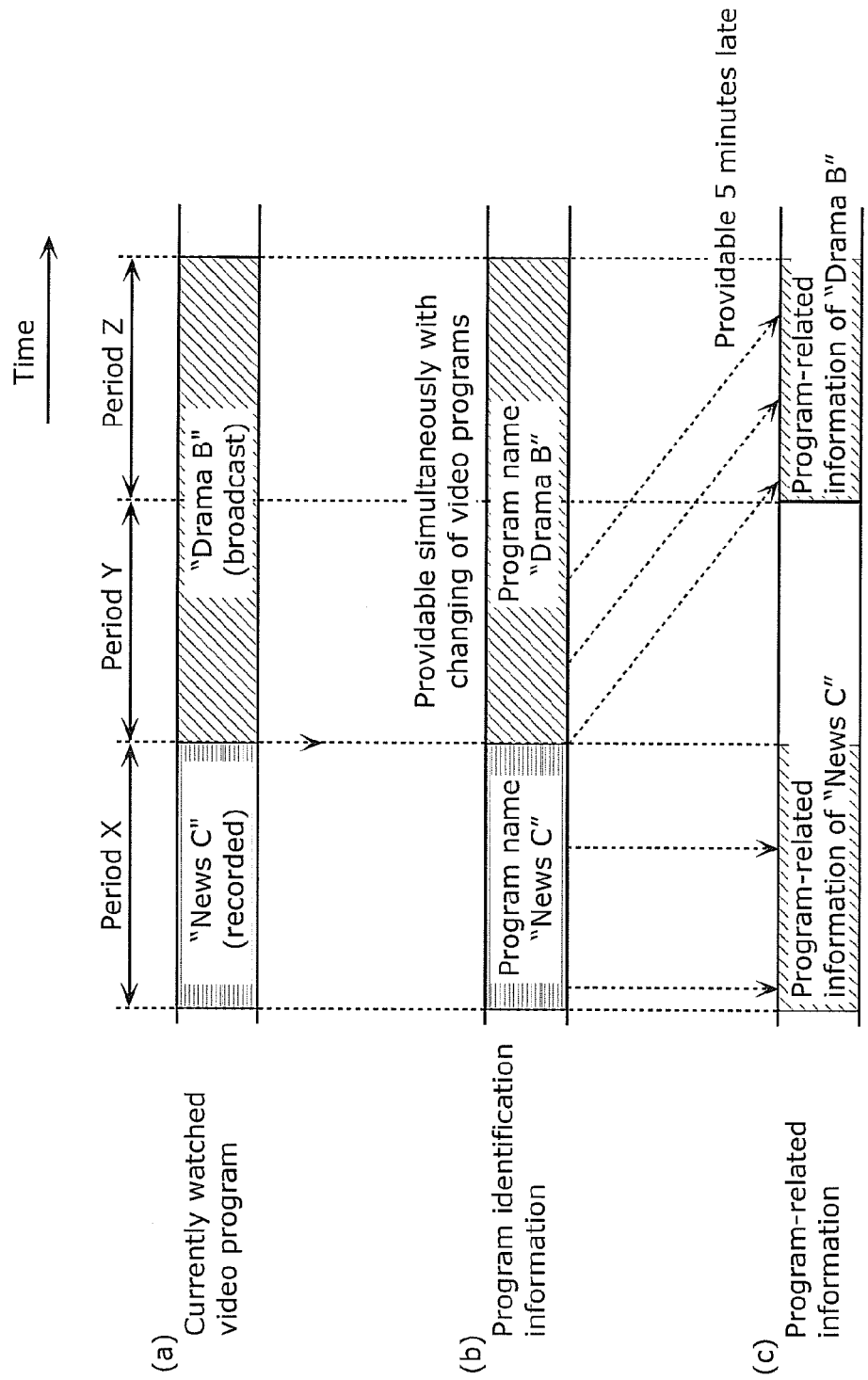
FIG. 15 shows a temporal relationship between a video program currently watched by a user, program identification information, and program-related information according to Embodiment 3.
Figure 16A:
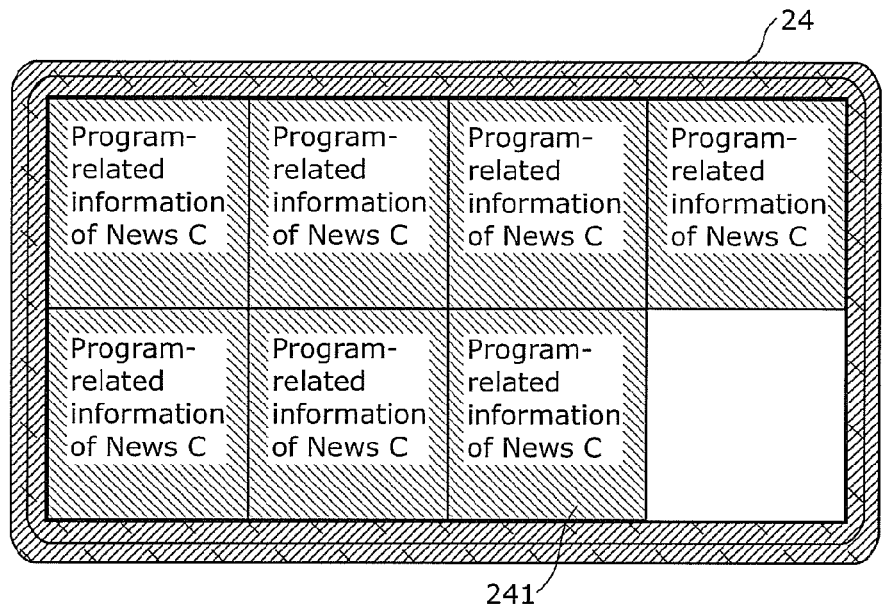
FIG. 16A shows a display example of a display unit of a mobile terminal according to Embodiment 3.
Figure 16B:
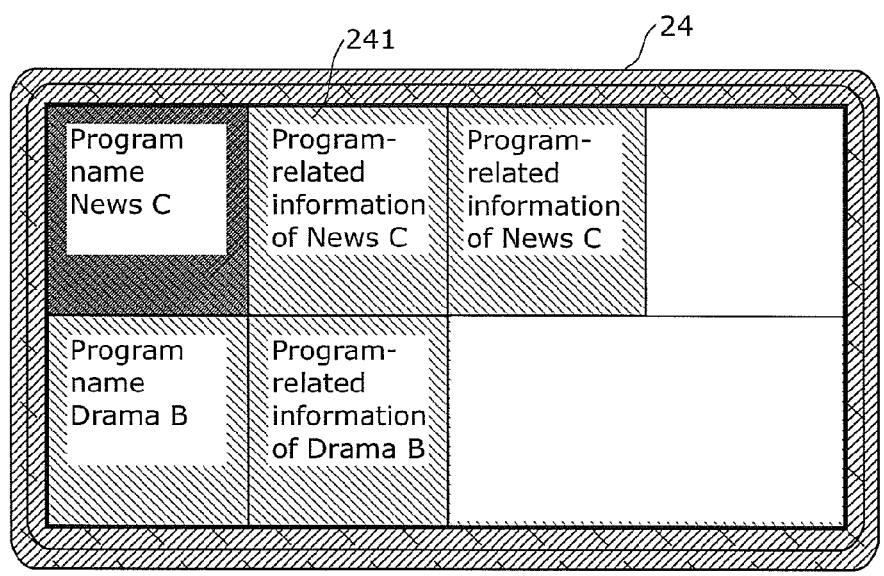
FIG. 16B shows another display example of the display unit of the mobile terminal according to Embodiment 3.
Figure 16C:
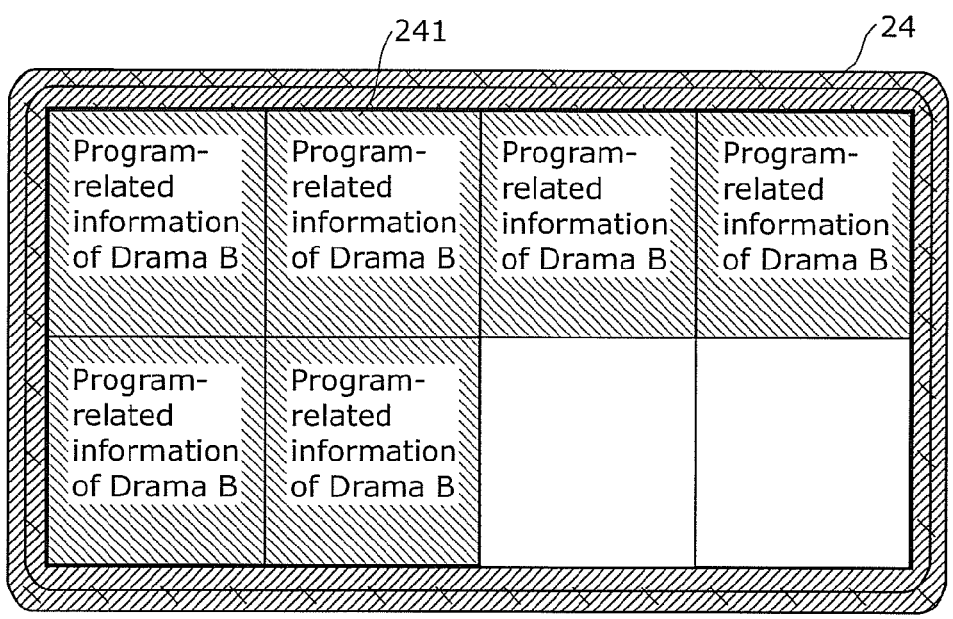
FIG. 16C shows another display example of the display unit of the mobile terminal according to Embodiment 3.

Referring to FIG. 15 to FIG. 16C, a description is given below of an example where the information display device (the mobile terminal 2) according to Embodiment 3 alleviates user stress by displaying program-related information (metadata) to the user even when no program-related information corresponding to a video program is available.

FIG. 15 shows a temporal relationship between a video program currently watched by a user, program identification information, and distributed program-related information according to Embodiment 3. FIG. 16A to FIG. 16C show display examples of the display unit 24 of the mobile terminal 2 according to Embodiment 3. FIG. 16A shows a display example of the display unit 24 of the mobile terminal 2 during Periods X and Y. FIG. 16B shows a display example of the display unit 24 of the mobile terminal 2 in an early period of Period C. FIG. 16C shows a display example of the display unit 24 of the mobile terminal 2 after an elapse of a predetermined period in Period C.

In FIG. 15, (a) shows an example where the video program watched in period X is changed from period Y.

Specifically, in FIG. 15, (a) shows an example where the video program "News C" previously recorded onto the television 9 with a recording function is displayed during period X, and "Drama B" distributed from the broadcast station is displayed during Periods Y and Z.

In FIG. 15, (b) shows an example of timing at which program identification information is transmitted from the information providing server 1. (b) of FIG. 15 shows change in program identification information provided from the information providing server 1. Specifically, (b) of FIG. 15 shows an example where the program identification information identifying "News C" is transmitted from the information providing server 1 during period X, and the program identification information identifying "Drama B" is transmitted from the information providing server 1 during Periods Y and Z.

As shown in (b) of FIG. 15, the program identification information of a video program distributed is changed at substantially the same timing as (a) of FIG. 15. In other words, the program identification information items are substantially synchronous with "News C" that is a video program previously recorded on the television 9 with a recording function and "Drama B" that is a video program distributed from the broadcast station 5 (not shown).

In FIG. 15, (c) shows an example of timing at which program-related information is transmitted from the information providing server 1. As (c) of FIG. 15 shows, there is a certain time difference between transmittable timing of the program identification information of a video program currently distributed from the broadcast station 5 and the transmittable timing of the program-related information (metadata) related to the video program.

More specifically, the television 9 with a recording function reproduces and displays the previously recorded video program "News C" during period X, and thus, the program-related information of the video program "News C" has already been generated. Hence, the program-related information corresponding to "News C" can be obtained by the mobile terminal 2 at substantially the same time as (in synchronization with) display timing of "News C". On the other hand, the television 9 with a recording function displays the video program "Drama B" during period Y. Since the video program "Drama B" is distributed from the broadcast station 5, the program-related information of the video program is provided a predetermined period later than the video program "Drama B". In other words, the mobile terminal 2 is unable to obtain the program-related information of "Drama B" in synchronization (coordination) with "Drama B" during period Y, and is able to obtain the program-related information of "Drama B" after an elapse of a predetermined period that is in period Z.

Accordingly, the mobile terminal 2 (the terminal control unit 23) according to Embodiment 3 displays, on the display unit 24, the program-related information of the video program displayed immediately before on the television 9 with a recording function till the program-related information of "Drama B" can be obtained. More specifically, as FIG. 16A shows, the display unit 24 of the mobile terminal 2 displays, during Periods X and Y, only the program-related information items of "News C" that have been already been obtained.

The mobile terminal 2 is able to obtain the program-related information of "Drama B" from period Z. However, the mobile terminal 2 may not be able to obtain a sufficient number of program-related information items for a while after start of period Z. In such a case, as FIG. 16B shows, the mobile terminal 2 displays, on the display unit 24, the program related information items of both "News C" watched immediately before and "Drama B" newly obtained.

When the mobile terminal 2 obtains a sufficient number of program-related information items of "Drama B" after a certain period, as FIG. 16C shows, the display unit 24 displays the program-related information items of only "Drama B".

[3-2. Advantageous Effect, Etc.]

As described above, according to Embodiment 3, even when the mobile terminal 2 is unable to obtain a sufficient number of program-related information items of a video program after changing of video programs, the mobile terminal 2 is able to display the program-related information of the video program watched (reproduced) or the like immediately before. Accordingly, the mobile terminal 2 is able to display some kind of program-related information, and thus, it is possible to avoid a situation that no program-related information is displayed.

Hence, even when program-related information (metadata) related to a video program is distributed with a time lag relative to actual broadcast of a video program, it is possible to avoid causing user stress when there is no metadata relative to the actual broadcast video program or the like being displayed till the actual distribution of the metadata.

Embodiment 4

A display example of program-related information on a mobile terminal (an information display device) is described below with reference to FIGS. 17A and 17B as Embodiment 4.

Figure 17A:
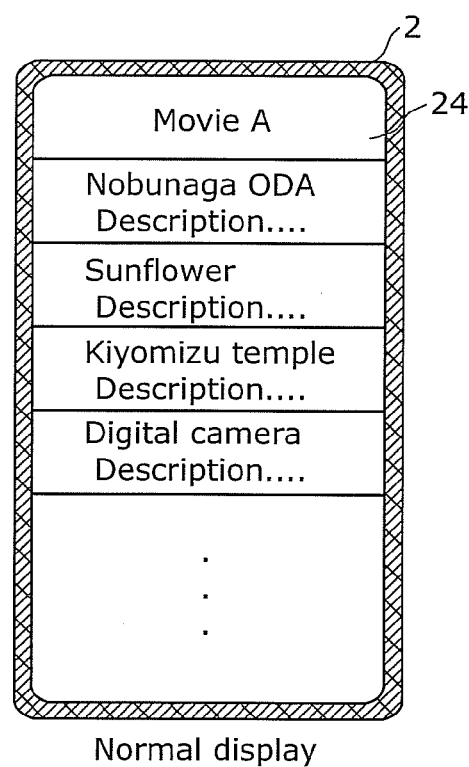
FIG. 17A shows a display example of program-related information according to Embodiment 4.
Figure 17B:
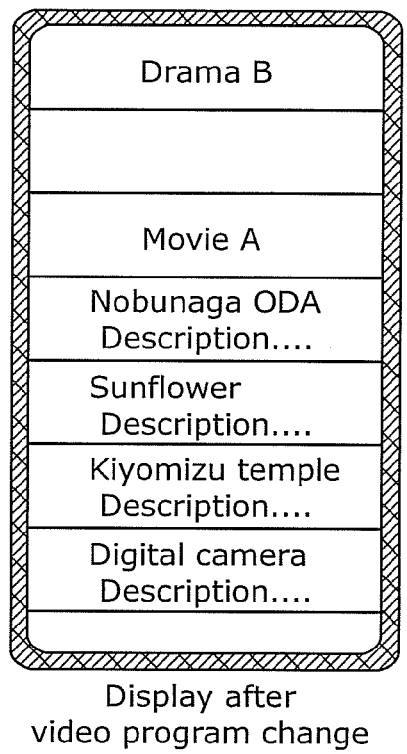
FIG. 17B shows another display example of program-related information according to Embodiment 4.

FIG. 17A and FIG. 17B show display examples of program-related information according to Embodiment 4.

FIG. 17A shows an example where program-related information items of a single video program are displayed in a different manner from that in FIG. 9A. Specifically, the name of a video program, "Movie A", is displayed on the upper portion of the display unit 24, and "program-related information" of the video program is displayed below the program name.

FIG. 17B shows an example where program-related information items of a currently watched video program and another program are displayed in a different manner from that in FIG. 9B. Specifically, the name of the currently displayed video program "Drama B" is displayed at the uppermost portion of the display unit 24, and the program-related information of the currently displayed "Drama B" is displayed below the program name. Additionally, the name of another video program watched immediately before or the like, "Movie A", is displayed below that, and program-related information of the other video program "Movie A" is displayed below the program name.

According to the display examples described in Embodiment 4, the user of the mobile terminal (the information display device) can easily identify which program-related information item corresponds to which program.

Other Embodiments

As above, Embodiments 1 to 4 have been described as exemplary embodiments of the technique disclosed in the present disclosure. However, the technique in the present disclosure is not limited to the above-described embodiments and is also applicable in embodiments obtained by making appropriate modification, replacement, addition, omission, etc., to the above-described embodiments. Furthermore, structural elements described in Embodiments 1 to 4 may be combined to provide a new embodiment.

The present disclosure includes the following case.

(1) The above devices can specifically be implemented using a computer system which includes a microprocessor, a read only memory (ROM), a random access memory (RAM), a hard disk unit, a display unit, a keyboard, and a mouse, for example. The RAM or the hard disk unit stores a computer program. The microprocessor operates on the computer program, which causes each of the units to achieve a function thereof. Here, the computer program includes a combination of plural command codes indicating an instruction to the computer in order to achieve a predetermined function.

(2) Some or all of the structural elements included in each of the above devices may be included in a single system Large Scale Integration (LSI). A system LSI is an ultra-multifunction LSI manufactured with plural structural units integrated on a single chip. Specifically, the system LSI is a computer system including a microprocessor, a ROM, a RAM, and so on. The ROM stores a computer program. The microprocessor loads the computer program from the ROM to the RAM and carries out an operation or the like on the loaded computer program, which causes the system LSI to achieve a function thereof.

(3) Some or all of the structural elements included in each of the above devices may be included in an IC card or a single module detachable to and from each of the devices. The IC card or the module is a computer system which includes a microprocessor, a ROM, a RAM, and so on. The IC card or the module may also include the above ultra-multifunction LSI. The microprocessor operates on the computer program, which causes the IC card or the module to achieve a function thereof. The IC card and the module may also be tamper-resistant.

(4) One or more embodiments of the present disclosure may be implemented in the method described above. The embodiments may also be implemented using a computer program executing the method by a computer or may also be implemented using a digital signal including the computer program.

For example, software which implements the information display device according to each of the above embodiments is the following program.

Specifically, this program causes a computer to execute: obtaining a program-related information item following a video program displayed on a video display device, the program-related information item being related to the video program; and causing a display unit to display the program-related information item obtained in the obtaining, wherein, when first program-related information related to a first video program currently displayed on the video display device is not obtained in the obtaining following the first video program, in the causing, the display unit is caused to display a second program-related information item or a third program-related information item, the second program-related information item being distributed before the first video program is displayed on the video display device, the third program-related information being related to a second video program displayed on the video display device before the first video program is displayed on the video display device.

Furthermore, one or more embodiments of the present disclosure may be implemented using a computer-readable recording medium, such as a flexible disk, a hard disk, a CD-ROM, a Magneto-Optical disk (MO), a Digital Versatile Disc (DVD), a DVD-ROM, a DVD-RAM, a Blu-ray Disc (BD), and a semi-conductor memory, which stores the computer program or the digital signal. The one or more embodiments of the present disclosure may also be implemented using the digital signal stored in the recording medium.

In one or more embodiments of the present disclosure, the computer program or the digital signal may be transmitted via a network represented by an electronic communications line, a wireless or a wired communications line and the Internet, as well as data broadcasting, for example.

One or more embodiments of the present disclosure may be a computer system including a microprocessor and a memory. The memory may store the computer program, and the microprocessor may operate on the computer program.

The program or the digital signal may be stored in a recording medium and thus transferred or may be transferred via a network or the like so that one or more embodiments of the present disclosure is implemented by another independent computer system.

(5) The above embodiments and variations may be combined.

As above, the embodiments have been described as exemplary embodiments of the technique in the present disclosure. Accordingly, the accompanying Drawings and the detailed description have been provided.

Accordingly, in the structural elements stated in the accompanying Drawings and the detailed description, not only structural elements indispensable to solving the problems, but also structural elements not indispensable to solving the problems can be included in order to exemplify the above technique. It should therefore not be construed that those structural elements not indispensable are indispensable just because those structural elements not indispensable are stated in the accompanying Drawings and the detailed description.

In addition, since the above-described embodiments are intended to exemplify the technique in the present disclosure, various modification, replacement, addition, omission, etc., may be possible within the literal and equivalent scope of the CLAIMS.

INDUSTRIAL APPLICABILITY

An information display device according to the present disclosure is applicable to an information display device which alleviates user stress even when no program-related information corresponding to a video program is available. Specifically, the present disclosure is applicable to an information display device or the like which displays, on a mobile terminal or a television, information related to a currently watched television program.

The invention claimed is:

1. An information display device comprising:
a display unit;
an obtaining unit configured to transmit, to an external server, a program identification information item identifying a video program displayed on a video display device, and obtain a program-related information item related to the video program in response to the transmission of the program identification information item; and
a control unit configured to cause the display unit to display the program-related information item obtained by the obtaining unit,
wherein when the obtaining unit transmits, to the external server, a first program identification information item identifying a first video program currently displayed on the video display device and is unable to obtain a first program-related information item related to the first video program, the control unit is configured to cause the display unit to display a second program-related information item or a third program-related information item, the second program-related information item being distributed before the first video program is displayed on the video display device, the third program-related information item being related to a second video program displayed on the video display device before the first video program is displayed on the video display device,
the display unit includes a first number of display areas for displaying the program-related information item obtained by the obtaining unit, and
when the obtaining unit obtains a second number of the first program-related information items following the first video program, the control unit is configured to cause the display unit to display each of the second number of the first program-related information items in a different one of the second number of the display areas, and to display the second program-related information item or the third program-related information item in one or more remaining display areas obtained by subtracting the second number of the display areas from the first number of the display areas, the second number being less than the first number.

2. The information display device according to claim 1, further comprising
an obtained information retaining unit configured to retain the second program-related information item or the third program-related information item obtained by the obtaining unit before the first video program is displayed on the video display device,
wherein when the obtaining unit is unable to obtain the first program-related information item following the first video program, the control unit is configured to cause the display unit to display the second program-related information item or the third program-related information item retained in the obtained information retaining unit.

3. The information display device according to claim 1, wherein when the obtaining unit is unable to obtain the first program-related information following the first video program, the obtaining unit is configured to externally obtain the second program-related information item or the third program-related information item.

4. An information display method comprising:
(a) transmitting, to an external server, a program identification information item identifying a video program displayed on a video display device,
(b) obtaining a program-related information item related to the video program in response to transmitting the program identification information item; and
(c) causing a display unit to display the program-related information item obtained in (b),
wherein, when transmitting, to the external server, a first program identification information item identifying a first video program currently displayed on the video display device, if a first program-related information related to the first video program currently displayed on the video display device is not obtained in (b), the display unit is caused to display a second program-related information item or a third program-related information item, the second program-related information item being distributed before the first video program is displayed on the video display device, the third program-related information being related to a second video program displayed on the video display device before the first video program is displayed on the video display device,
the display unit includes a first number of display areas for displaying the program-related information item obtained by an obtaining unit, and
when the obtaining unit obtains a second number of the first program-related information items following the first video program, a control unit is configured to cause the display unit to display each of the second number of the first program-related information items in a different one of the second number of the display areas, and to display the second program-related information item or the third program-related information item in one or more remaining display areas obtained by subtracting the second number of the display areas from the first number of the display areas, the second number being less than the first number.

* * * * *